C. M. NEVINS.
FILLER FOR VEHICLE TIRES.
APPLICATION FILED AUG. 19, 1915.
1,180,523. Patented Apr. 25, 1916.
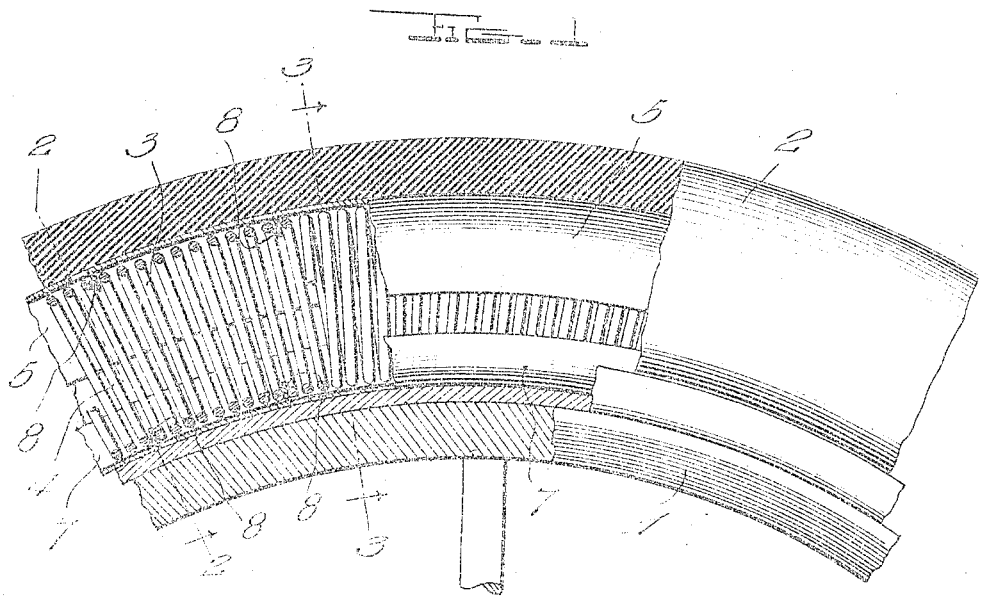
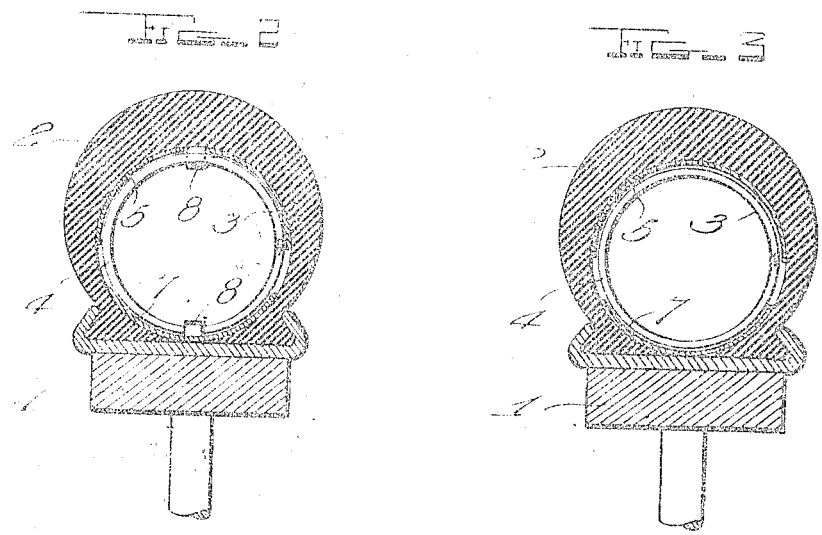
Witnesses
Inventor
Claud M. Nevins
Attorneys

UNITED STATES PATENT OFFICE.

CLAUD M. NEVINS, OF FRONTIER, MICHIGAN.

FILLER FOR VEHICLE-TIRES.

1,180,523.  Specification of Letters Patent.  Patented Apr. 25, 1916.

Application filed August 19, 1915. Serial No. 46,360.

*To all whom it may concern:*

Be it known that I, CLAUD M. NEVINS, a citizen of the United States, residing at Frontier, in the county of Hillsdale and State of Michigan, have invented certain new and useful Improvements in Fillers for Vehicle-Tires; and I do declare the following to be a full, clear, and exact description of the invention, such as will enable others skilled in the art to which it appertains to make and use the same.

This invention relates to improvements in tires and particularly those employing a resilient filler inclosed within a shoe or casing, and has for its object to provide a simply constructed device of this character which will efficiently carry out the purpose for which it is designed.

Another object of my invention is to provide a filler which will take the place of the usual pneumatic inner tube of the ordinary automobile tire.

A further object of my invention is to provide a smooth bearing surface adjacent the inner side of the usual outer casing or shoe.

With these and other objects in view, my invention resides in certain novel features of construction, combination and arrangement of parts which will be hereinafter more particularly described and claimed and shown in the drawings wherein:

Figure 1 represents a side elevation of a portion of an automobile tire partly in section so as to illustrate my invention; Fig. 2 is a transverse section taken on the line 2—2 of Fig. 1; Fig. 3 is a similar view taken on the line 3—3 of Fig. 1.

In the embodiment illustrated wherein like reference characters designate corresponding parts throughout the several views, 1 indicates the rim of an automobile wheel on which is mounted the usual outer casing or shoe 2. My invention resides in providing a filler for this shoe which will take the place of the usual pneumatic inner tube but which will at the same time provide an equally efficient shock absorbing device without any of the attendant disadvantages. This filler comprises an endless tubular body 3 formed of a single piece of spring steel wire 4 disposed within the casing 2 as clearly illustrated in the several figures of the drawings. This coil is curved to conform substantially to the curvature of the wheel and preferably has its ends united by soldering or brazing. Between the outer portion of this tubular body 3 and the inner side of the shoe 2, I have provided an endless flexible sheet-metal ring 5 which conforms substantially to the curvature of the tubular body 3 and covers preferably the outer half of this body as shown. A similar endless sheet-metal ring 7 is designed to be placed around the inner portion of the tubular body and to cover slightly less than the inner half or about one third of said body. This additional flexible ring also conforms to the curvature of the coil. At spaced intervals on these rings are formed tongues 8 preferably struck from these rings as shown in Fig. 2 and which are adapted to extend inwardly between the convolutions of this coil spring 3, thereby preventing any longitudinal shifting of the rings relative to said coil. These tongues 8 merely extend inwardly into the interior of the tubular body 3, thus allowing a slight lateral shifting of the rings on said body.

I desire to lay particular emphasis on the fact that this filler takes the place of the pneumatic inner tube used in the ordinary form of automobile tire. This filler will prevent the ordinary forms of tire troubles such as punctures and blow-outs and will greatly lengthen the life of the outer casing because of the fact that there is no air pressure from within to break through the walls of said casing when they become weakened.

Inasmuch as the outer ring covers substantially the outer half of the coil and the inner ring somewhat less than one half, a contracted opening will be formed between said rings on each side of the coil. The coil is readily retained between the rings when out of the shoe 2 because of the above set forth reason.

From the foregoing description of the construction of my improved tire filler, the manner of applying the same to use and the advantage thereof will be readily understood and it will be seen that I have provided a simple, inexpensive and efficient means for carrying out the objects of the invention.

While I have particularly described the elements best adapted to perform the functions set forth, it is obvious that various changes in form, proportion, and in the minor details of construction, may be resorted to within the scope of the appended claim without departing from or sacrificing any of the principles of this invention.

I claim as my invention:

A filler for a pneumatic tire shoe comprising an endless tubular body formed from a single coil of wire, an endless resilient sheet metal ring U-shaped in cross section and of a uniform thickness throughout, said ring covering the outer half of said coil, a second endless resilient sheet metal ring of uniform thickness throughout, shaped to fit said body and adapted to cover the inner third of said coil to leave a contracted opening between said rings, said rings also covering a sufficient portion of the coil to retain it therebetween when out of the shoe, radially extending straight tongues struck at intervals from said rings on the longitudinal centers thereof and bent to project inwardly between the convolutions of said coil, whereby the rings will be prevented from shifting longitudinally thereon, and at the same time being allowed a slight lateral movement.

In testimony whereof I have hereunto set my hand in presence of two subscribing witnesses.

CLAUD M. NEVINS.

Witnesses:
 ADA HAYNER,
 F. L. HAYNER.